United States Patent [19]

Tamosauskas

[11] 4,440,885

[45] Apr. 3, 1984

[54] PEROXIDE EMULSIONS AND SIZING COMPOSITION CONTAINING SAME

[75] Inventor: Albert E. Tamosauskas, Pittsburgh, Pa.

[73] Assignee: PPG Industries, Inc., Pittsburgh, Pa.

[21] Appl. No.: 364,713

[22] Filed: Apr. 2, 1982

Related U.S. Application Data

[63] Continuation-in-part of Ser. No. 136,644, Apr. 2, 1980, abandoned.

[51] Int. Cl.³ .................. C08K 3/40; C08K 5/54; C08K 9/06; C03C 17/30
[52] U.S. Cl. .................. 524/57; 106/243; 106/287.15; 106/287.16; 106/287.23; 252/186.26; 252/312; 428/278; 428/394; 523/203; 523/211; 523/212; 523/214; 523/217; 523/333; 524/108; 524/232; 524/264; 524/280; 524/281; 524/300; 524/310; 524/312; 524/313; 524/317; 524/339; 524/345; 524/369; 524/372; 524/375; 524/376; 524/559; 524/563
[58] Field of Search .............. 523/203, 211, 233, 212, 523/214, 217; 524/57, 232, 264, 300, 372, 375, 377, 108, 280, 281, 563, 559, 312, 313, 339, 345, 369, 376, 310, 317; 106/243, 287.15, 287.16, 287.23; 252/186, 312

[56] References Cited

U.S. PATENT DOCUMENTS

| | | | |
|---|---|---|---|
| Re. 28,818 | 5/1976 | Eymans et al. | 252/186 |
| 2,343,094 | 2/1944 | Smith | 428/375 |
| 2,886,532 | 5/1959 | Richmond et al. | 252/186 |
| 3,013,915 | 12/1961 | Morgan | 428/391 |
| 3,061,554 | 10/1962 | Vartanian et al. | 252/426 |
| 3,118,866 | 1/1964 | Gregorian | 260/94.9 |
| 3,377,407 | 4/1968 | Kressin et al. | 252/426 |
| 3,484,223 | 12/1969 | Vanderbilt et al. | 65/3 |
| 3,485,811 | 12/1969 | Levine et al. | 252/426 |
| 3,490,936 | 1/1970 | Cole et al. | 117/54 |
| 3,520,825 | 7/1970 | Kochler et al. | 252/426 |
| 3,583,959 | 6/1971 | Shen et al. | 260/45.7 |
| 3,635,834 | 1/1972 | Cilento et al. | 252/314 |
| 3,775,341 | 11/1973 | Barter | 252/426 |
| 3,795,630 | 3/1974 | Jaspers et al. | 252/426 |
| 3,837,898 | 9/1974 | McCombs et al. | 260/29.7 H |
| 3,840,426 | 10/1974 | Flautt et al. | 260/17 R |
| 3,849,148 | 11/1974 | Temple | 252/8.9 |
| 3,855,175 | 12/1974 | Kakizaki | 260/42.15 |
| 3,969,299 | 7/1976 | Burns et al. | 260/29.6 HN |
| 3,988,261 | 10/1976 | Barter et al. | 252/431 C |
| 3,989,661 | 11/1976 | Bondy | 260/23 EM |
| 4,009,132 | 2/1971 | Furukawa et al. | 260/22 R |
| 4,039,475 | 8/1977 | Oosterwijk et al. | 252/431 R |
| 4,039,716 | 8/1977 | Johnson | 428/378 |
| 4,049,592 | 9/1977 | Motsinger | 260/18 S |
| 4,067,835 | 1/1978 | Takamori et al. | 260/29.6 PM |
| 4,105,584 | 8/1978 | Norback et al. | 252/426 |
| 4,228,047 | 10/1980 | Pippin et al. | 260/17.4 ST |
| 4,245,072 | 1/1981 | Uraneck et al. | 525/209 |
| 4,259,190 | 3/1981 | Fahey | 428/378 |
| 4,263,362 | 4/1981 | Straka | 428/378 |

FOREIGN PATENT DOCUMENTS

| | | | |
|---|---|---|---|
| 912591 | 10/1972 | Canada . | |
| 39-7426937 | 7/1974 | Japan | 524/262 |
| 55-157608 | 12/1980 | Japan | 260/29.6 PM |

OTHER PUBLICATIONS

Derwent Abst., 35218V/19, Mitsubishi, J48034950, (May 23, 1973), "Synthetic Elastomer ..."
Sheppard et al., "Azo and Peroxide F. R. Initiators ...," 33rd Annual Technical Conference 1978.
"Licidol, Organic Peroxides" Product Bulletin Pennwatt Chemicals, Buffalo, New York, Bulletin #7.301.
Derwent Abst. 446 W/01 J49053958, (5-25-74), Mitsubishi, "Glass Fiber ..."
Derwent Abst., 57717V/32, J74026937, (7-13-74), Mitsui, "Reinforced Polyolefin Pros ..."

*Primary Examiner*—John C. Bleutge
*Assistant Examiner*—Herbert J. Lilling
*Attorney, Agent, or Firm*—Kenneth J. Stachel

[57] ABSTRACT

An aqueous emulsion of a solid, water insoluble or limited water soluble organic peroxide is provided that has improved stability, dilutability and safety but still having an average particle size of 1.5 microns or less and a good particle size distribution. The emulsion has from about 10 weight percent of the emulsion of a solid peroxide selected from the group of hydroperoxides α, -oxy and α-peroxy hydroperoxides, dialkyl peroxides, aldehyde and ketone peroxides, diacyl peroxides, peroxyesters, peroxy acids, peroxydicarbonates, monoperoxycarbonates and perketals.

The emulsion also has a hydrocarbon solvent having a high kauri-butanol number if the organic peroxide has a substantial amount of aromaticity and a low kauri-butanol number if the organic peroxide has little or no aromaticity and one or more nonioic emulsifiers and at least about 20 weight percent of water. The method of preparing the emulsion involves solubilizing the peroxide in the hydrocarbon solvent and adding the emulsifiers and emulsifying. The emulsion of organic peroxide can have many uses including uses in vinyl and diene polymerization, and being used in a sizing composition for glass fibers to produce treated glass fiber strands that can be used in polymer reinforcement such as the reinforcement of polyolefins, polyamides and polyester.

25 Claims, No Drawings

PEROXIDE EMULSIONS AND SIZING COMPOSITION CONTAINING SAME

This application is a continuation-in-part of U.S. patent application Ser. No. 136,644, filed Apr. 2, 1980 now abandoned.

BACKGROUND OF THE INVENTION

The present invention is directed to an aqueous emulsion prepared from a solid organic peroxide, an aqueous size containing the emulsion, and sized glass fibers. More particularly, the present invention is directed to an aqueous peroxide emulsion made from a solid organic peroxide, aqueous treating solution containing same, and sized glass fibers prepared for bonding to polymers in the reinforcement of polymeric materials.

Organic peroxides that decompose by initial cleavage of the oxygen-oxygen bond to produce free radicals act as initiators for vinyl monomers and other vinyl containing materials. There are over fifty different organic peroxides classified into nine major types that are used commercially in the polymer and resin industries. The half-life ($T_{\frac{1}{2}}$) which is given as a function of temperature can range for the various peroxides from a short half-life at 0.01 hours at elevated temperature to a longer half-life of 1,000 hours at lower temperatures. The half-life is a measure of the thermal stability of organic peroxides by measuring the time for decomposition of 50 percent of the original amount of peroxide which is a 50 half-life for a first-order reaction. These organic peroxides have been used in the polymerization of vinyl monomers to produce bulk polymers, polymer films and other polymer compositions.

Depending on the thermal stability and other physical characteristics of the particular peroxides, various organic peroxides can be used in different forms when acting as an initiator or curing agent for vinyl polymerization. Some of the organic peroxides such as the highly reactive percarbonates are so unstable that they must be shipped as a frozen solid or an undiluted liquid under refrigeration. Some less reactive organic peroxides, such as lauroyl peroxides and dibenzoyl peroxide are more stable at room temperature and can be activated with greater facility and with less stringent precautions. For example, the relatively more stable benzoyl peroxide, which is a solid at room temperature having a melting point of 106° to 107° C. can be used as granules or crystals or in a thick paste compounded with a phlegmatiser such as tricresyl phosphate. Also, benzoyl peroxide can be used in an aqueous solution as is shown in U.S. Pat. No. 2,343,084 (Smith) wherein the small amount of benzoyl peroxide is dissolved in one or more polymerizable conjugated compounds and may also contain a resin in a solution. This solution can be combined with a water solution of a partially saponified polyvinyl acetate. Also, it has been suggested in U.S. Pat. No. 3,795,630 (Jaspers et al.) to have a chemically stable non-separating organic peroxide composition of an organic peroxide which is a solid at room temperature. The composition is obtained by mixing the solid peroxide, like benzoyl peroxide, with a liquid phlegmatiser like phthalate plasticizers, epoxidized soya bean oil and glycols, and a hydrophobic alkyl group containing silica. In addition, it is shown in U.S. Pat. No. 4,039,475 (Jannes) to have a stable, pumpable aqueous suspension of organic peroxides containing one nonionic emulsifier having a maximum HLB value of 12.5 and a second nonionic emulsifier having a minimum HLB value of 12.5 or a second emulsifier that is anionic.

Organic peroxides such as aryl alkyl peroxide like dicumyl peroxide; ester peroxides and aromatic and aliphatic acyl peroxides have been used in compositions for sizing fibrous materials for use in polymer application as shown in U.S. Pat. No. 3,013,915 (Morgan). These peroxides which have low volatilities and low decomposition temperatures, usually below about 180° F. (82° C.), are deposited from an organic solution. In the composition along with the organic peroxide, there is present a suitable coupling agent.

It is also known as is shown in U.S. Pat. No. 3,837,898 (McCombs et al.) to form a polybutadiene emulsion that contains heat activated curing agents to operate as a catalyst in the size coating on the fibers. The curing agents are the well-known free radical catalysts such as organic peroxides, e.g., benzoyl peroxide, lauroyl peroxide, tert-butyldiethyl peracetate, diacetyl peroxide, as well as inorganic peroxides, such as potassium persulfate. The polybutadiene emulsion is prepared by mixing the polybutadiene with an emulsifying agent and with benzoyl peroxide. To this mixture there is added sufficient water to form an emulsion of the liquid polymer in aqueous medium. The emulsion is then mixed with a mixture of water, glass fiber anchoring agents and a gel agent and the resulting composition is homogenized to form a sizing composition having a solids content of about 2.80 and a pH of about 10.0 to 10.5. The emulsifying agents that can be used are any conventional emulsifying agents, but preferably are the nonionic emulsifying agents such as the polyoxyethylene derivatives of fatty acid, partial esters of sorbitol anhydrides, or the polyoxyethylene derivatives of fatty alcohols, or of the alkyl substituted phenols.

It was recently suggested in U.S. Pat. No. 3,849,148 (Temple) to prepare an aqueous size for glass fibers to be used in reinforcing polyolefin materials wherein the size contained a coupling agent, a heat stable organic peroxide, a nonionic surfactant and usually a lubricant or softener, and optionally a film-former. The heat stable organic peroxide includes organic peroxides having peak decomposition temperatures above about 200° F. (93° C.), for example, alpha alpha' bis(t-butyl peroxy)-diisopropyl benzene, tris(t-butyl peroxy)-diisopropyl benzene, 2,5(t-butyl peroxy)hexane, and 2,5(t-butyl peroxy)hexyne. These heat stable peroxides are used in emulsions with nonionic surfactants such as polyethoxy phenols being prepared and dispersed in water containing a coupling agent. Emulsions prepared at temperatures in the range of 120° F. (49° C.) to 210° F. (99° C.) including isooctyl phenyl polyethoxy ethanol are particularly useful. Other useful nonionic surfactants belonging to the class of polyethoxy phenols are nonyl polyethoxy ethanol and alkyl etherpolyethoxyethanol. Other nonionic surfactants which are useful are polyalkylene glycol ethers, alkyl polyether alcohol and alkyl aryl polyether alcohol. The emulsion is prepared by thoroughly mixing the peroxide initiator with the nonionic surfactant maintaining the temperature of the mixture above the melting point of the free radical initiator. Suitable temperature control is possible by immersing the mixing vessel in a bath of boiling water. After thoroughly mixing the free radical peroxide initiator with nonionic surfactant, water is slowly added to the mixture at a temperature above the melting point of the free radical initiator, preferably in th range of about 140° F. (60° C.) to 150° F. (65° C.) until the emulsion inverts.

The emulsion is slowly cooled to ambient conditions by continued water addition. This emulsion is then slowly added to the aqueous mixture containing the coupling agent and the remaining water is added to the mixture to form an aqueous sizing composition for treating glass fibers.

In forming an emulsion for use in a sizing composition for glass fibers, it is necessary to obtain an emulsion with a small particle size and that has shear, shelf and process stability. It is necessary to have an emulsion rather than a dispersion because of the particle size limitation. An emulsion is a two-phase system consisting of two incompletely miscible liquids, the one being dispersed as fine droplets in the other, whereas a suspension is a two-phase system where the dispersed phase is a solid. The particle size and particle size distribution of an emulsion are controlled by such factors as the quantity or the efficiency of the emulsifier, the order of mixing and the type of agitation employed. The stability of an emulsion depends upon such factors as (1) particle size, (2) difference between the densities of the material in the internal phase, which is the liquid broken-up into droplets and of the material of the external phase, which is the surrounding water, (3) the viscosity of the emulsion concentrate, (4) the charges on the particles, (5) choice of emulsifier type and amount of emulsifier used, and (6) the conditions of storage and use, including the temperatures of storage and use, agitation, dilution, and evaporation.

The average particle size and particle size distribution of the emulsion are controlled by such factors as the quantity or the efficiency of the emulsifier, the order of mixing and the agitation employed. The average particle size and particle size distribution of the emulsion are important factors, since large liquid particles or droplets in the emulsion or, for that matter, particles of solid material as in a suspension would not provide an adequate uniform coating to the glass fibers. Also solid particles would abraid the glass fibers, and large liquid particles would cover the surface of the glass fiber in a spotty fashion leaving hiatuses in the coating along the fibers that as a result would not adequately contact the matrix resin to be reinforced.

The emulsion in a sizing composition for glass fibers must be diluted to the extent of approaching a water thin liquid in order to facilitate application to the glass fibers during formation of the fibers. Dilution of an emulsion, especially dilution to the extent of a water thin liquid, can lead to an unstable emulsion. Also, the emulsion in a sizing composition must be shear stable to withstand the mixing of the sizing composition before being applied to the glass fibers. In addition, the emulsion must be shelf stable for periods of three days to more than a week so that the material may be stored before application to the glass fibers. Also, the emulsion must be process stable so it can be applied to the glass fibers.

A problem that has recently surfaced with the use of heat stable, solid organic peroxides is that when they are used in an emulsion which is formed at temperatures above the melting point of the peroxide, the resulting emulsion that is used at temperatures below the melting point of the peroxide tends to have particle sedimentation or particle creaming.

An additional problem with the use of solid organic peroxides in aqueous treating solutions in general is the chance of a violent decomposition reaction during the emulsification process. Since the solid peroxides must be heated to be melted, the use of the elevated temperatures would bring the peroxide closer to its decomposition temperature and a possible violent reaction could occur if the decomposition temperature is reached.

It is an object of the present invention to provide a safer method of preparing an emulsion of a solid organic peroxide that has a melting point and decomposition temperature at elevated temperatures.

It is another object of the present invention to provide an emulsion of a solid peroxide that can be diluted to have a viscosity approaching the viscosity of water and that has improved water stability and improved shelf stability, and improved process stability.

It is an additional object of the present invention to provide an emulsion of a heat-stable organic peroxide that can be used in a sizing composition for glass fibers, where the emulsion is shear stable and shelf stable and process stable within the sizing composition.

It is a further additional object of the present invention to provide processes for preparing an emulsion of a heat-stable organic peroxide and a sizing composition containing same where the peroxide emulsion has improved dilutability, shear stability, and shelf stability, and process stability and fine particle size with a minimum particle size distribution.

It is another further object of the present invention to provide sized glass fiber strands having fibers in the strand with a coating of an aqueous sizing composition containing a coupling agent, an emulsion of heat stable organic peroxide that has improved dilutability, improved shear, shelf and process stability, and a minimum particle size distribution and fine average particle size; and usually a lubricant or softener; and optionally, a film-former.

The average particle size and particle size distribution of the emulsion is an important factor, since large liquid particles in the emulsion, or for that matter, particles of solid material as in a suspension would not efficiently coat the surface of the glass fibers and would be prone to separate from the sizing composition. In addition, solid hard particles in the sizing composition could abrade the glass fibers.

SUMMARY OF THE INVENTION

The aforementioned objects and other objects of the present invention that can be eclectically gleaned from the following description are accomplished by having an oil-in-water emulsion of an organic peroxide that is a solid at 20° C. and that forms active free radicals at elevated temperatures and that is water insoluble or that has limited water solubility, with one or more hydrocarbon solvents, with one or more emulsifiers with an HLB value in the range of about 9 to about 20 and water.

The solid peroxides that are water insoluble or that are of limited water solubility include hydroperoxides, α-oxy and α-peroxy hydroperoxides, dialkyl peroxides, aldehyde or keton peroxides, diacyl peroxides, peroxyesters, peroxyacids, peroxydicarbonates, peroxymonocarbonates and perketals.

The hydrocarbon solvent for use in the inventive emulsion can be any of the low polar, strongly hydrophobic solvents including pine oils, white spirits, special boiling point spirits and aromatic solvents. The one or more hydrocarbon solvents have a kauri-butanol number from about 50 to about 100 when the solid peroxide is of aromatic character or have a kauri-butanol number of around 10 to about 50 when the solid peroxide is of an aliphatic character. Character, in this sense, means the main portion of the peroxide molecule is aromatic with aromatic or aliphatic side groups, or the main portion is aliphatic with aliphatic or aromatic side groups. In addition, it is most beneficial if the hydrocarbon solvent is a fugitive solvent that can be removed from the aqueous emulsion when the emulsion is dried on a substrate.

The emulsion also has one or more nonionic emulsifiers with an HLB (hydrophilic-lipophilic balance) value in the range of about 9 to about 20. Non-exclusive examples include emulsifier types such as polyethoxy phenols, polyalkylene glycol ethers, alkyl polyether alcohol, alkylaryl polyether alcohol, ethylene oxide, ethoxylated alcohols; ethoxylated alkyl phenols, ethoxylated fatty acids, fatty esters and oils, fatty acids, glycerol esters, glycol esters, monoglycerides and derivatives, sorbitan derivatives, and sucrose esters and derivatives, alkylated phenol condensation products and condensation products of ethylene oxide and propylene glycol polyethylene derivatives of fatty acids, partial esters of sorbitol anhydrides and mixtures thereof in sufficient amounts to emulsify the organic peroxide. The emulsifiers are most useful in a three emulsifier blend with emulsifiers from the aforementioned emulsifier types selected in proper weight ratios to give an overall HLB in the range of about 9 to about 20.

The emulsion also contains water in sufficient amounts to make the emulsion of an oil-in-water emulsion. If the emulsion is to be shipped any considerable distance, the amount of water added is just that amount needed to invert most of the water insoluble or limited soluble material to an oil-in-water emulsion thereby making the emulsion a concentrated oil-in-water emulsion. The concentrated oil-in-water emulsion can be further diluted at the location of use.

The aforedescribed emulsion of the organic peroxide has many uses in the polymerization of vinyl and diene polymers. The emulsion is particularly useful in a sizing composition for glass fibers to be used in polymer applications. The sizing composition is an aqueous composition containing a coupling agent, the organic peroxide-containing emulsion, and usually a lubricant or softener, and optionally a film-former.

The process for preparing the emulsion containing the organic peroxide involves first solubilizing the solid organic peroxide in the hydrocarbon solvent and then adding one or more surfactants and adding water and emulsifying using equipment and techniques known to those skilled in the art.

The aqueous size containing the organic peroxide emulsion is used to treat glass fibers during the formation of the glass fibers. The glass fibers so treated are then heated to drive off a predominant amount of the water in the aqueous sizing composition and the dried treated glass fibers are used for bonding or reinforcing polymers such as homo and copolymers of polyolefins, polyamides, polyesters and the like.

The most useful solid, water-insoluble, or limited water soluble, organic peroxides in the aqueous sizing composition are those having the formula:

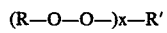

where
R is a tertiary alkyl or aralkyl or aryloyl or alkyloyl radical and x is a number 1, 2, or 3, and
R' is the same as R or of the structure:

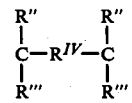

wherein $R^{IV}$ is a phenyl, alkylphenyl, alkyne or alkyl group having the structure:

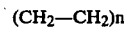

where R" and R''' are either hydrogens, or individual hydrocarbon radicals or are alkylene radicals connected to form a cycloalkylene radical. Either hydrocarbon radical R" and R''' may be alkyl, cycloalkyl, aralkyl, or aryl hydrocarbon radicals, when $R^{IV}$ is a phenyl group, and either R" or R''' hydrocarbon radicals are phenyl, aryl or alkyls larger than $C_7H_{15}$ radical when $R^{IV}$ is the $(CH_2-CH_2)_n$ radical where n is 1, 2 or 3. The (R—O—O) can be attached at any position on the R' group, for example in bis or tris arrangement when R' is di or trialkyl benzene where the alkyl groups are located on any position such as ortho, meta and/or para or in 8,11 arrangement when R' is $(CH_2-CH_2)$.

DETAILED DESCRIPTION OF THE INVENTION

For preparation of a more stable, dilutable and safe emulsion, non-exclusive examples of the solid, water-insoluble, organic peroxides include:

2,5 dihydroperoxy; 2,5-dimethylhexane; 1,4 dihydroperoxy-1,4-dimethylbutane; 1,4 dihydroperoxy-1,4-dimethyl-2-butyne; 1,3- and 1,4-bis (α-hydroperoxyisopropyl)-benzene; bis(1-hydroxycyclohexyl)peroxide, 1-hydroperoxy-1'-hydrodicyclohexyl peroxide, dicumyl peroxide, 2,5-di(hydroperoxy)-2,5-dimethylhexyne, 2,5-di(hydroperoxy)-2,5-dimethyl hexane and hydroperoxides having structural formulas as follows: tert butyl —$CM_eEt$—O—OH; HO—O—$CM_{e2}(CH_2)_4$-$CM_{e2}$—O—OH; HO—O—$CM_eEt$—C=C—C=C—C-$M_eEt$—O—OH; HO—O—C[<$(CH_2)_5$]—C—C—[-(<$CH_2)_5$]—O—OH; HO—O—C[<$(CCH_2)$-5]—C—C—C—C—[<$(CH_2)_5$]—O—OH; 1,3- and 1,4(di-tert butylperoxyisopropyl)benzene, 8,11 bis-(tertiary butylperoxy)-8,11 dimethyl octadecane, and mixtures thereof, tribenzyl; tertiary butyl bis peroxide; di-tetradecone peroxide; di-hexadecaneperoxide; di-tribenzyl methyl peroxide; dilauroyl peroxide; dedecanoyl peroxide; dipelargonyl peroxide; dicaprylyl peroxide; diisononanoyl peroxide; dibenzoyl peroxides and nuclear substituted derivatives thereof; 2,5-dimethyl-2,5-di(benzoylperoxy)hexane; dimyristyl peroxydicarbonate; dicetyl peroxidicarbonate bis(4-tert butyl cyclohexyl peroxydicarbonate; and 2,2 bis 4,4 ditert butyl peroxycyclohexyl propane 1,1-ditert butylperoxy-4-tert butylclohexane; 2,5-bis-(tertiary amylperoxy)-2,5 dimethylhexane; 1,1'ethylene bis[1-(tertiary-amylperoxy)cyclohexane]; 2,5-bis (tertiary-butyl peroxy)-2,5-diphenylhexane; 2,6-bis(tertiary-butyl peroxy)-3,6-dimethyloctane; α,α,α',α'-tetramethyl isophthalyl di-t-butyl bis peroxide; and α,α,α',α' tetramethyl isophthalyl dicumyl bis peroxide; and tris-(t-butyl peroxy)diisopropyl benzene.

An aqueous emulsion can be made with any of the aforedescribed solid, water-insoluble, or limited water soluble, organic peroxides that are more dilutable, stable and safer and that has a fine particle size and minimum particle size distribution by using the hydrocarbon solvent and one or more emulsifiers and then emulsifying with water.

The particular hydrocarbon solvents, emulsifiers, and method of making the emulsion would be the same for any of the aforementioned solid, water-insoluble or limited water soluble organic peroxides. The solid, water-insoluble or limited water soluble organic peroxides for which the aqueous emulsion and method of making same is most useful are the peroxides having a melting point closer to the decomposition temperature of the peroxide than to ambient temperature. For these peroxides the temperature required for melting would cause a safety risk in too closely approaching the decomposition temperature. As a result, especially in production facilities with less than perfectly controlled and monitored equipment, violent decomposition reactions may occur.

The emulsion and method of making the emulsion is most useful for even the more heat stable organic peroxides, since even these peroxides may have melting points that approach the decomposition temperatures of the peroxide and could be used in a safer operation.

The more heat stable organic peroxides can be used as free radical initiators in the polymerization of vinyl and diene containing monomers or polymers. By more heat stable organic peroxide, it is intended that those peroxides having a half-life exceeding 60 hours at 212° F. (100° C.) and 20 minutes at 300° F. (149° C.) be encompassed. The term half-life is a measure of reactivity of the organic peroxide and is defined as the time it takes for one half of a given quantity of peroxide to decompose at a particular temperature. Particularly useful more heat stable organic peroxides are like those with the formula as shown above, i.e.,

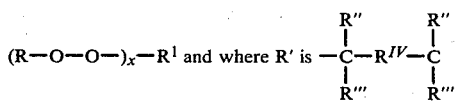

Non-exclusive examples of these organic peroxides include solid dialkyl peroxides and diarylalkyl peroxides such as the bis(tertiaryalkyl peroxy) alkanes in which R is a tertiary alkyl radical having 4 to 8 carbon atoms and either R" and R'" are primary alkyl radicals having 1 to 8 carbon atoms, while the other has greater than 3 carbon atoms. Additional non-exclusive examples include: 2,5-bis-(tertiary amylperoxy)-2,5 dimethylhexane, 1,1' ethylene bis[1-(tertiaryamylperoxy)cyclohexane]; 2,5-bis-(tertiary-butyl peroxy)-2,5-diphenyl-hexane; 3,6-bis(tertiary-butyl peroxy)-3,6 dimethyloctane. A non-exclusive example of the diarylalkyl peroxide that can be used is 1,3 and/or 1,4(ditertiary butyl peroxy) diisopropylbenzene; or alpha, alpha, alpha', alpha'-tetramethyl-isophthalyl-di-t-butyl bis peroxide; and alpha, alpha, alpha', alpha' tetramethyl-isophthalyl-di-cumyl-bis-peroxide; and tris(t-butyl peroxy)diisopropyl benzene. Other dialkyl peroxides that can be used include 2,5(t-butyl peroxy)hexane and 2,5(t-butyl peroxy)hexyne and 8,11-bis(tertiary butylperoxy)-8,11-dimethyl octadecane. In addition, the tert-alkyl peroxy esters, also known as peresters, that are more stable can also be used. Several of these peroxy esters include tert-butyl peroxy acetate; tert-butyl peroxy benzoate; di-tert-butyl diperoxyphthalate; mono-tert-butyl permaleate; di-tert-butyl peroxy hexahydro terephthalate; di-tert-butyl peroxy adipate; di-tert-butyl peroxy terephthalate; di-tert-butyl peroxy phthalate; and mono-tert-butyl peroxy phthalate. The amount of the solid peroxide used in the emulsion is that amount needed to incorporate into the sizing composition an amount of active peroxide in the range of about 0.1 to about 6.0 percent by weight. Generally, the amount can range from about 1 to about 70 weight percent of the emulsion, and preferably has a lower limit of at least 10 weight percent for use in a sizing composition.

Acceptable fugitive hydrocarbon solvents for use in liquifying or solubilizing the solid organic peroxide, which, if predominantly aliphatic, will have a low kauri-butanol value such as from about 10 to about 50 and having boiling ranges which lie within the range of ambient temperature to about 200° C. If the organic peroxide compound has more than about 60 percent aromaticity, the acceptable hydrocarbon solvent will have a kauri-butanol value of from about 50 to about 100 with a boiling range which lies within the range of about 100° to about 250° C. The kauri-butanol number is a measure of solvent power of petroleum thinners where the value is the number of milliliters of solvent required to cause cloudiness when added to 20 grams of a solution of kauri gum in butyl alcohol. The solution is prepared in the proportion of 100 grams of kauri gum and 500 grams of butyl alcohol. Solvents of low aromatic content are strong precipitants for the resin and, therefore, give low values. Conversely, the solvents having a high aromaticity give high values. The kauri-butanol numbers are preferably determined against one of two standards where the one standard is a one degree toluene with a value of 105 used where the hydrocarbon solvent gives a kauri-butanol value of over 60 and the other standard is a mixture of 75 percent of n-heptane and 25 percent toluene when the hydrocarbon solvent has a kauri-butanol number of 40. This is discussed in ASTM Standard D 0.1133-54 T.

Examples of hydrocarbon solvents with low kauri-butanol numbers useful, when the organic peroxide has a substantial amount of aliphatic components, or only a minor amount, if any, of aromatic components, are the isoparaffinic hydrocarbon solvents. Suitable examples are those of the series of commercially available isoparaffinic hydrocarbon solvents sold by Exxon Company, U.S.A. under the trademark "ISOPAR" or Phillips Petroleum, under the trademark "SOLTROL", which have boiling ranges within the above ranges.

Examples of hydrocarbon solvents with high kauri-butanol values include the solvent commercially available under the tradename HI-SOL-10 or HI-SOL-15 available from Ashland Chemical Co., Ohio, where the HI-SOL-10 has a boiling point of 308° F. (153° C.) and a flash point of 105° F. (40.6° C.) and an evaporation rate of 25.0 using ether base of 1. Also, the hydrocarbon solvent sold by Exxon Co., USA division of Exxon Corp. Company under the name "SOLVESSO 150" or "SOLVESSO 100" can be used.

The ratio of organic peroxide to hydrocarbon solvent is at least a ratio of 1 to 0.75 when the hydrocarbon solvent has a kauri-butanol number of 70. If the solvent is a better solvent for the peroxide, like Hi-Sol-10 solvent that has a kauri-butanol number like 92-93 when the organic peroxide is alpha, alpha' bis(t-butyl peroxy)-diisopropyl benzene, the minimum amount of solvent that could be used would be less than that in the ratio above, such as a ratio of 1 to around 0.4 and even as low as 0.19. If the solvent is a poorer solvent than the one having the kauri-butanol value of 70 when the organic peroixde is alpha, alpha' bis(t-butyl peroxy)diisopropyl benzene, then the minimum amount of solvent would be higher than the ratio. The amount of the hydrocarbon solvent used in making up the emulsion of the solid organic peroxide will generally vary within the range of about 1 to 70 and preferably about 10 to about 55 percent by weight of the emulsion. More solvent can always be added, but there is no benefit to such a practice, since the solvent is usually removed at some later time.

The nonionic emulsifiers that are preferably selected from polyethoxy phenols, polyalkylene glycol ethers, alkyl polyether alcohol, alkylaryl polyether alcohol, ethylene oxide alkylated phenol condensation products, and condensation products of ethylene oxide and propylene glycol having an HLB value in the range of about 9 to about 20 can be used singly or in a combination in the emulsion to give the desired HLB value. An example of an emulsifier used singly is the octyphenoxy polyethoxy ethanol available from Rohm & Haas Company, under the brandname or trade designation "Triton X-100", which is nonionic and has an HLB of 13.5. The HLB as used herein refers to the hydrophilic/lipophilic balance. The types of emulsifiers such as the "Triton X-100" can be prepared from alkyl substituted phenols, where the alkyl group has 6 to 12 carbon atoms. The number of moles of ethylene oxide per mole of hydrophobe (alkyl phenol) can vary between 1.5 and about 30. The weight percent of combined ethylene oxide is usually from about 40 to about 95 percent to achieve good water solubility, more typically, about 60 to about 95 percent. Another example of such an emulsifier is nonylphenoxy poly(ethyleneoxy) ethanol. It is not necessary that a single emulsifier be used to give the proper HLB. Any two or more surfactants having known HLBs can be combined using the proper proportions, and if the HLB is not known for a particular emulsifier, it can be calculated from one or several known formulas. See the article by W. C. Griffin, entitled: "Calculation of HLB Nonionic Surfactant" in the December, 1954 issue of the Journal of the Society of Cosmetic Chemistry. Typically, the emulsifier represents between about 1 and about 15 weight percent, more usually between 3 and about 12 weight percent, of the emulsion. The exact amount of the emulsifier required can be ascertained easily by simple trial and error technique using the aforementioned ranges as a guideline. Once a stable emulsion is obtained, use of more emulsifier is not necessary and would not give any further benefits and could prove detrimental in leading to increased migration of an aqueous treating solution containing the emulsion from a treated substrate like a package of fibrous material.

It is particularly useful to use a three emulsifier blend in the emulsion of the present invention. The three emulsifiers are selected with proper weight ratios to give an overall HLB value in the range of about 9 to about 20 and preferably 9 to 15. One emulsifier is selected that has a high HLB value in the range of about 12 to about 20. A second emulsifier has a lower HLB value in the range of about 6 to about 12, and a third emulsifier has an HLB value in a middle range of about 9 to about 15. The three emulsifiers are used in amounts that give a total HLB in the range of about 9 to about 20. It is particularly useful to use the emulsifiers in equal proportions, although any proportion of the various emulsifiers can be used to give the desired HLB range.

In preparing the emulsion of the present invention, one or more of the desired peroxides is dissolved in the fugitive hydrocarbon solvent suitable for the particular organic peroxides involved. This mixture may be subjected to moderately elevated temperatures to facilitate solubilization of the organic peroxide. The mixture of peroxide dissolved in the hydrocarbon solvent has added to it the one or more emulsifiers, and this mixture is emulsified using standard techniques, conditions and apparatus.

When the emulsifier is the three component emulsifier blend, the individual emulsifiers can be added separately to the mixture of peroxide and hydrocarbon solvent, or they can be added in a combination of all three, or any two can be added as a combination and then the third emulsifier added individually. After the emulsifiers are added, the resulting mixture is subject to standard techniques, conditions and equipment of emulsification known to those skilled in the art. Such techniques include subjecting the mixture to high shear and diluting slowly with water, where the water can be at ambient temperature or at some elevated temperature. The water is added until the emulsion inverts to an oil-in-water emulsion and then the emulsion is slowly cooled to ambient conditions by continued water addition. The amount of water added to the emulsion is at least about 20 percent of the emulsion composition. If the emulsion is to be shipped any considerable distance, the least amount of water is used so that there is inversion of most of the water insoluble or limited water soluble materials to an oil-in-water emulsion.

The emulsion composition is then formed into an aqueous sizing composition having a coupling agent, and usually a lubricant or softener, and optionally a film-former. This formation can involve slowly adding the emulsion to an aqueous mixture containing the coupling agent and any lubricant or softening agent and film-former and the remaining water to make the aqueous sizing composition. Also, any lubricant or softening agent or film-former to be used in the sizing composition can be added after the emulsion is added to the aqueous mixture containing the coupling agent. The amount of the emulsion composition incorporated into the sizing composition depends on the amount of peroxide in the emulsion composition. Depending on this amount of peroxide, the amount of emulsion used in the sizing composition is that amount to give an amount of active organic peroxide in the sizing composition in the range of about 0.1 to about 6 percent by weight of the sizing composition. Once the emulsion of the present invention is prepared the aqueous sizing composition can be made in a manner similar to that as described in U.S. Pat. No. 3,849,148 (Temple) which is hereby incorporated by reference. Generally, the amount of organic-silane coupling agent that is usually a vinyl-containing silane in the sizing composition is in the range of about 0.5 to about 10 percent by weight of the aqueous sizing composition. The amount of lubricant in the sizing composition, which is a cationic active acid solubilizable fatty acid amide, is generally in the range of about 0.001 to about 1 percent by weight of the aqueous sizing composition. If a film-former is used, it is usually a polyvinyl acetate polymer or copolymer in an amount in the range of about 0.05 to about 12 weight percent of the size.

The aqueous sizing composition is applied to individual glass fibers during their formation by any conventional method for applying sizing to glass fibers. Such methods are shown in U.S. Pat. No. 3,849,148 (Temple) which has been incorporated by reference.

The sized glass fibers are dried to remove moisture and the fugitive hydrocarbon solvent, although some residual moisture and solvent may remain on the glass fibers. The dried sized glass fibers can be used in any form such as fibers, strands, wet or dry chopped strands, mats and the like for reinforcing polymers, like polyamides, polyesters, and particularly polyolefins. Glass fiber mats for reinforcing polyolefins are shown in U.S. Pat. No. 3,849,148 which shows the production of glass fiber reinforced polyolefin laminates which has been incorporated by reference.

Preferred Embodiment

The emulsion of the present invention is preferably an emulsion of alpha, alpha' bis(t-butyl peroxy)-diisopropyl benzene including meta and para isomers which is commercially available from Hercules, Inc., under the trade designation "Vul-Cup R" vulcanizing agent and polymerization catalyst. The solid peroxide is used in a ratio of peroxide to hydrocarbon solvent in amounts to facilitate solubilization of the peroxide, but preferably in a weight ratio of peroxide to solvent in the range of about 50/50 to about 70/30, and most preferably a ratio of around 60/40 peroxide to solvent. The hydrocarbon solvent is preferably the solvent commercially available under the trade designation "HI-SOL 10", available from Ashland Chemical Company. The organic peroxide is dissolved in the HI-SOL-10 where the amount of HI-SOL-10 is in the range of about 10 to about 30 weight percent of the aqueous emulsion composition.

It is preferred to use the three emulsifier blend, in the preparation of the emulsion of the present invention. The first emulsifier is a trimethyl nonyl polyethylene glycol ether, such as, that commercially available from Union Carbide Corporation by the trade designation "Tergitol TMN-6" having an HLB of 11.7. This ether is used in an amount of about 0.1 to about 5 weight percent of the emulsion. The ether emulsifier is combined with the second emulsifier which is nonyl phenoxy polyethyleneoxy ethanol, commercially available from GAF Corporation Chemical Products, under the trade designation "Igepal CO-630" having an HLB of 13 and used in an amount of about 0.1 to about 5 weight percent of the aqueous emulsion. These two emulsifying agents are combined and stirred until clear. The third emulsifying agent is a condensate of propylene oxide with hydrophilic bases formed by condensing ethylene oxide with ethylene glycol and is commercially available from BASF Wyandotte Industrial Chemical Group, under the trade designation "Pluronic-P-65" which has an HLB of 17 and is used in an amount in the range of about 0.1 to about 5 weight percent of the aqueous emulsion composition. The total amount of the three emulsifier blends in the aqueous emulsion composition is in the range of about 1 to about 15 weight percent (preferably about 3 to about 12 weight percent) of the sizing composition. An amount in excess of 15 weight percent could be used but it would lead to migration of the size from the sized glass fibers.

It is preferred to add the emulsifier blend in the following manner. The glycol-oxide produce emulsifier has the total amount to be added split into two portions. The first portion, preferably around one-half of the total amount, is added to the peroxide in the solvent along with the mixture of the ether emulsifying agent and the ethanol emulsifying agent that is added to the hydrocarbon peroxide solution. The remaining portion of the glycol-oxide product emulsifier is dissolved in water with agitation in around a 50 to 50 weight blend and is added at the other materials during the emulsification operation. This emulsification operation includes agitating the materials and adding an amount of water to about 25° to about 30° C. in the range of about 15 to 30 weight percent of the aqueous emulsion composition. An amount of cold water is added to give an amount of active peroxide in the range of about 35 to 65 weight percent and preferably around 50 weight percent of the aqueous emulsion.

The aqueous emulsion is preferably added to an aqueous composition containing a coupling agent, that is preferably vinyl tris(beta methoxy ethoxy) silane, present in an amount of about 0.5 to about 10 weight percent of the aqueous sizing composition. In an alternative embodiment, a lubricant such as "Emerylube 6717" commercially available from Emery Industries, is present in the sizing composition in an amount in the range of about 0.001 to about 3 weight percent of the aqueous sizing composition. In another alternative embodiment, a film-former like a polyvinyl acetate copolymer is used in an amount of around 0.5 to about 12 weight percent of the aqueous sizing composition. The amount of water in the aqueous sizing composition usually ranges from about 70 to about 99 weight percent of the sizing composition.

The aqueous sizing composition is applied to individual glass fibers during their formation according to the manner illustrated in U.S. Pat. No. 3,849,148 (Temple) hereby incorporated by reference. The aqueous emulsion of the organic peroxide can be used in any of the sizing compositions described in U.S. Pat. No. 3,849,148.

The aqueous emulsion of the present invention will be further elucidated by making reference to the following examples.

Table I presents examples showing components of the aqueous emulsion in their gram weight amounts and weight percent amount.

TABLE I

| | Samples - gram wt./(wt. %) | | | | | | |
|---|---|---|---|---|---|---|---|
| Component | 1 | 2 | 3 | 4 | 5 | 6 | 7 |
| Alpha, alpha' bis(t-butyl peroxy)-diisopropyl benzene "V Cup R" peroxide (42.7% solids) Hydrocarbon solvent | 315(22.7) | 2363 | 2363 | 2363 | 1260(53.6) | 630(26.1) | 473(25) |
| Hi-Sol-10 solvent | 242(17.4) | 1814 | 1814 | 1814 | 242(10.3) | 484(20) | 189(10) |
| Solvesso 150 Solvent | — | — | — | — | — | — | — |
| Ratio of Peroxide/solvent | 1/.77 | 1/.77 | 1/.77 | 1/.77 | 1/0.19 | 1/.77 | 1/0.4 |
| Nonionic Emulsifiers; Trimethyl nonyl polyethylene glycol ether (Tergitol | 25(1.8) | 187.6 | 140.7 | 93.8 | 50(2.1) | 50(2.1) | 38(2.0) |

TABLE I-continued

| | Samples - gram wt./(wt. %) | | | | | | |
|---|---|---|---|---|---|---|---|
| TMN-6) | | | | | | | |
| Nonyl phenoxy polyethyleneoxy ethanol (Igepal CO-630) | 25(1.8) | 187.6 | 140.7 | 93.8 | 50(2.1) | 50(2.1) | 38(2.0) |
| Propylene oxide-ethylene oxide condensate (Pluronic-P-65) | 25(.8) | 187.6 | 140.7 | 93.8 | 50(2.1) | 50(2.1) | 38(2.0) |
| Octylphenoxypolyethoxyethanol (Triton-X-100) | — | | | | | | |
| Water (Warm) | 313(22.5) | sufficient to give a solids | | | 700 | 626(26) | 22.5(11.9) |
| (Cold) | 443(21.9) | content of 50% + 0.15% | | | 2352 | — | 88.9(47) |

| Component | 8 | 9 | 10 | 11 | 12 | 13 |
|---|---|---|---|---|---|---|
| Alpha, alpha' bis(t-butyl peroxy)-diisopropyl benzene "Vul Cup R" peroxide (42.7% solids) | 945(27) | 1890(31.3) | 2363(37.9) | 6300(37.7) | 394(35) | 4726(38.3) |
| Hydrocarbon solvent | 726(20.8) | 1050(17.4) | 1818(29) | 4848(29) | 303(27) | — |
| Hi-Sol-10 solvent | — | — | — | — | — | 3635(29.5) |
| Ratio of Peroxide/solvent | 1/0.8 | 1/0.55 | 1/.76 | 1/0.77 | 1/0.77 | 1/0.77 |
| Nonionic Emulsifiers; Trimethyl nonyl polyethylene glycol ether (Tergitol TMN-6) | 75(2.1) | 150(2.5) | — | — | 23.5(2.1) | 282(2.3) |
| Nonyl phenoxy polyethyleneoxy ethanol (Igepal CO-630) | 75(2.1) | 150(2.5) | — | — | 23.5(2.1) | 282(2.3) |
| Propylene oxide-ethylene oxide condensate (Pluronic-P-65) | 75(2.1) | 150(2.5) | — | — | 23.5(2.1) | 282(2.3) |
| Octylphenoxypolyethyoxyethanol (Triton-X-100) | | | 370(5.9) | 1008(6.0) | — | — |
| Water (Warm) | 470(13.4) | 940(15.6) | 1689(27) | 4542(27.2) | 120(10.7) | 1400(11.4) |
| (Cold) | 1128(32.3) | 1706(28.3) | | | 234.5(2) | 1718(13.9) |

In Table I, the emulsion preparation, number 5, was made by initially melting the organic peroxide using a hot water bath at a temperature of 140° to 150° F. (60° to 66° C.). Afterwards, the hydrocarbon solvent was added with mixing. The ether and ethanol type emulsifiers were added next with continued mixing. This blend was subjected to a high speed Eppenbach mixer without heat in order to uniformly distribute the emulsifiers. One half of the total amount of the propylene oxide ethylene oxide condensate emulsifier was added and the blend was agitated for around 10 minutes. The other half of the propylene oxide ethylene oxide condensate emulsifier was combined with water and added to the blend with continuous agitation. This split addition avoids any possibility of any salting out of the emulsifier. Dilute cold water was added to the Eppenbach to bring down the temperature to 110° F. (43° C.) or less. The blend was emulsified by adding cold water with high speed mixing. After around 10 to 30 minutes, the speed of the high speed mixer was reduced and the emulsion was diluted to the desired concentration.

In the other emulsions and sizing compositions the organic peroxide was dissolved in the hydrocarbon solvent with a slight heating usually not above 100° F. (378° C.) A standard mixer was used for approximately 45 minutes and the final solution was usually clear. The ether type and ethanol type emulsifiers were added to this mixture and then the condensate type emulsifier was dissolved in hot water, and stirred about 30 minutes until cool. The hydrocarbon mixture of emulsifiers and organic peroxide was subjected to an Eppenbach mixer then the aqueous solution of the propylene oxide-ethylene oxide condensate type emulsifier was added to the mixture slowly until the inversion phase occurred. The inverted mixture was then diluted with cold water to the desired peroxide concentration.

Table II shows sizing compositions made with several of the emulsions of Table I.

The sizing compositions were prepared by placing approximately 2½ gallons (9.5 liters) of cold water in a mix tank, and adding acetic acid with stirring. Slowly the silane was added to the main mix tank and stirred for around 30 minutes until near complete hydrolysis of the silane occurred. The lubricant, partially amidated, polyalkylene amine was dissolved in hot water and diluted with cold water until reaching a temperature of 100° F. (37.8° C.) and then added to the main mix tank. The emulsion which was previously prepared was then added to the main mix tank. The polyvinyl acetate filmformer was added to cold water with agitation and added to the main mix tank. The volume of the sizing composition was then brought to 10 gallons.

TABLE II

| | Size from Emulsions in TABLE I | | | | | | | |
|---|---|---|---|---|---|---|---|---|
| | Emulsions | | | | | | | |
| Components | 1 gm/wt % | 5 gm/wt % | 6 gm/wt % | 7 gm/wt % | 10 gm/wt % | 11 gm/wt % | 12 gm/wt % | 13 gm/wt % |
| Emulsion | 278(7.3) | 5560(7.4) | 483(12.8) | 378(10) | 201.2(5.3) | 416(5.5) | 16,698(7.7) | 224.4(5.9) |
| Acetic Acid | 4.2(.1) | — | 8.4(.2) | 6.3(.2) | 4.2(.1) | 10.5(.1) | 422(.2) | 5.3(.1) |
| Vinyl tris (2-methoxy ethoxy) | 106.4(2.8) | 2128(2.8) | 212.8(5.6) | 159.6(4.2) | 106.4(2.8) | 266(3.5) | 10,632(4.9) | 133(3.5) |

TABLE II-continued

| | Size from Emulsions in TABLE I | | | | | | | |
|---|---|---|---|---|---|---|---|---|
| | Emulsions | | | | | | | |
| | 1 | 5 | 6 | 7 | 10 | 11 | 12 | 13 |
| Components | gm/wt % | gm/wt % | gm/wt % | gm/wt % | gm/wt % | gm/wt % | gm/wt % | gm/wt % |
| silane [A-172 available from Union Carbide Corporation] | | | | | | | | |
| Partially amidated polyalkyleneimine fiber lubricant [Emery 6717] | 0.7(.02) | 14(.02) | 1.4(.04) | 1.1(.03) | 0.7(.02) | 1.8(.02) | 70.3(.03) | 0.9(.02) |
| Polyvinyl acetate National Starch "Resyn 25-1031" | 56(1.5) | 1120(1.5) | 112(3.0) | 84(2.2) | — | 98(1.3) | 3,920(1.8) | 49(1.3) |
| Water | 3340(88.2) | 66,800(88.3) | 2967(78.4) | 3156(83.4) | 3472.5(91.7) | 6778(89.5) | 184,708(85.3) | 3372(89.1) |
| pH | | | 3.95 | | 3.9 | 4.1 | 4.0 ± 0.5 | — |
| Solids | | | 7.77% | | 3.1% | 4.39% | 6.97 | 4.44% |

Table III shows physical characteristics for several emulsions of Table I and of the sizing compositions of Table II. These physical characteristics include the particle size of the emulsion and sizing composition along with the stability of the emulsion in the sizing composition at various periods of time.

TABLE III

| | Results for Emulsions and Sizes of TABLES I & II | | | | | | | |
|---|---|---|---|---|---|---|---|---|
| | 1 | 6 | 7 | 9 | 10 | 11 | 12 | 13 |
| Particle Size (microns) | | | | | | | | |
| Emulsion | 1.59 | 1.25 | 0.97 | 0.99 | — | — | — | — |
| Size | 1.73 | 5.36 | 3.61 | — | — | — | — | — |
| Stability Initial | | | | | | | | |
| emulsion | good | very good | good | excellent | good | — | ok(L-LY) | good(OVLY) |
| Size | good | good | good | — | good | — | " | " |
| 24 hrs. shelf stability | | | | | | | | |
| Emulsion | — | very good(vl) | — | — | good | ok(OLY) | M-M-Y | good(OLY) |
| Size | — | very good | — | — | good | " | " | " |
| 48 hrs. shelf stability | | | | | | | | |
| Emulsion | — | — | — | — | good | ok(OLY) | M-M-M-Y | goody(OLY) |
| Size | — | — | — | — | good | " | " | " |
| 72 hrs. shelf stability | | | | | | | | |
| Emulsion | good | good(vl) | ok(l) | — | — | ok(OLY) | M-M-Y | good(OVLY) |
| Size | good | light separation redispersible | ok(l) | — | — | ok | " | " |
| 4 day | | | | | | | | |
| Emulsion | — | — | — | — | — | ok(OLY) | M-M-Y | good(OLY) |
| Size | | | | | | ok(OLY) | " | " |
| 7 day | | | | | | | | |
| Emulsion | — | — | — | — | — | ok oily appearance | HHY few particles | good(OLY) |
| Size | | | | | | ok | | | where
Y = Dispersible sedimentation or separation
O = Zero, no separation
H = Heavy sedimentation
M = Moderate sedimentation
L = Light sedimentation The foregoing has described an emulsion of a solid, water insoluble or limited water soluble organic peroxide in a hydrocarbon solvent along with one or more emulsifiers to produce a stable emulsion which can have a shelf stability of as long as three months and that is dilutable and safe and that requires fewer precautions when prepared. The organic peroxide can be selected from various organic peroxides as discussed above and the hydrocarbon solvent varies somewhat with the type of organic peroxide. For example, when the organic peroxide has a low amount of aromaticity, the hydrocarbon solvent will have a kauri-butanol number in the range of about 10 to about 60. If the organic peroxide has a substantial amount of aromaticity, the hydrocarbon solvent will have a kauri-butanol number in the range of about 40 to about 100. One or more emulsifiers can be used for emulsification, but it is preferred to use the three component emulsifier blend wherein one emulsifier has an HLB in the range of about 12 to about 20 while the second emulsifier has an HLB in the range of about 6 to about 12, and the third emulsifier has an HLB in the middle range, a range of about 9 to about 15.

The sizing composition contains the above-described emulsion along with any of the conventional sizing composition components, such as coupling agents, film-formers, lubricants, and the like.

The process of producing the emulsion involves solubilizing the organic peroxide in the hydrocarbon solvent and then producing the emulsion.

Sized glass fibers in any form such as chopped fibers, strands, chopped strands, roving, and woven glass fiber strands made from any type of glass but usually made from "E-glass" or "621-glass" or low boron and/or low fluorine modifications thereof can be used for polymer reinforcement. Such a polymeric reinforced product is a polyolefin type product, namely polypropylene, reinforced with glass fiber strands sized with a sizing composition containing the aforedescribed emulsion. Other polymeric reinforced products include other polyolefins, polyamides, e.g., nylon, thermosetting polyesters and the like.

I claim:

1. Aqueous sizing composition for treating glass fibers, wherein the sizing composition has an aqueous emulsion of an organic peroxide that is a solid at about 20° C. and that has limited solubility or is insoluble in water, comprising:
   (a) an amount of an aqueous emulsion of the solid organic peroxide to give an amount of active peroxide in the aqueous sizing composition in the range of about 0.1 to about 6 percent wherein:
      (1) the solid organic peroxide with limited water solubility or that is insoluble in water selected from the group consisting of hydroperoxides, alpha-oxy, and alpha-peroxy hydroperoxides, dialkyl peroxides, aldehyde and ketone peroxides, diacyl peroxides, peroxy esters, peroxy acids, peroxy dicarbonates, monoperoxy carbonates and perketals is present in an amount of about 1 to about 70 percent by weight of the aqueous emulsion,
      (2) about 1 to about 70 weight percent of a hydrocarbon solvent having a kauri-butanol number from about 10 to about 60 when the organic peroxide is substantially aliphatic, or having a kauri-butanol number of about 40 to about 100 when the organic peroxide has substantial aromaticity,
      (3) about 1 to about 15 weight percent of a nonionic emulsifier blend having 3 emulsifiers, selected from the group consisting of polyalkylene glycol ethers, polyethoxy phenols, alkyl polyether alcohols, ethylene oxide alkylated phenol condensation products, alkyl aryl polyether alcohols, and polyoxypropylene-polyoxyethylene condensates, phenoxy polyethoxy ethanols, polyethylene derivatives of fatty acids, partial esters of sorbitol anhydrides; ethoxylated alcohols, ethoxylated alkyl phenols, ethoxylated fatty acids, ethoxylated fatty esters and oils; glycerol esters, glycol esters, monoglycerides and derivatives, sorbitan derivatives, sucrose esters and derivatives, and mixtures thereof each in proportions to give an overall hydrophilic-lipophilic balance (HLB) level for the emulsifier system in the range of about 9 to about 20, and
      (4) at least about 27 weight percent of water;
   (b) about 0.5 to about 10 weight percent of a coupling agent; and
   (c) about 70 to about 99 weight percent water.

2. A sizing composition of claim 1 having 0.001 to 1 weight percent of a lubricant.

3. A sizing composition of claim 1 wherein the coupling agent is vinyl tris(betamethoxyethoxy) silane.

4. A sizing composition of claim 2 wherein the lubricant is a cationic, acid solubilized fatty acid amide.

5. A sizing composition of claim 2 having 0.5 to about 12 weight percent of a film-former.

6. A sizing composition of claim 5, wherein the film-former is a vinyl acetate copolymer.

7. Glass fibers having the aqueous sizing composition of claim 1.

8. Glass fibers having the aqueous sizing composition of claim 2.

9. Glass fibers having the aqueous sizing composition of claim 5.

10. Aqueous sizing composition of claim 1, wherein the organic peroxide has a half-life exceeding 60 hours at 212° F. (100° C.) and 20 minutes at 300° F. (149° C.).

11. Sizing composition of claim 1, wherein the organic peroxide is alpha, alpha' bis(t-butyl-peroxy)-diisopropyl benzene.

12. Aqueous sizing composition of claim 11, wherein the hydrocarbon solvent has a kauri-butanol number of around 92 to 93.

13. Aqueous sizing composition of claim 12, wherein the peroxide to solvent ratio is at least 1/0.4.

14. Aqueous sizing composition of claim 1, wherein the three emulsifiers are present in equal amounts.

15. An aqueous sizing composition for treating glass fibers, wherein the sizing composition has an aqueous emulsion with an average particle size of around 1.5 microns or less and with good stability, wherein the emulsion is of an organic peroxide that is a solid at about 20° C., and that has limited solubility or is insoluble in water and that has a half-life exceeding 60 hours at 212° F. (100° C.) and 20 minutes at 300° F. (149° C.), comprising:
   (1) an amount of an aqueous emulsion of the solid organic peroxide to give an amount of active peroxide in the aqueous sizing composition in the range of about 0.1 to about 6 percent, wherein the emulsion comprises:
      a. about 1 to about 70 percent by weight of the solid organic peroxide having the formula:

$(R-O-O-)_x R'$ where R is a tertiary alkyl, aryloyl or alkyloyl radical with or without a phenol group attached to the tertiary carbon atom,
      where x is a number 1, 2 or 3,
      where R' is the same as R or is an organic moiety having the formula:

$$\begin{array}{ccc} R'' & & R'' \\ | & & | \\ C & -R^{IV}- & C \\ | & & | \\ R''' & & R''' \end{array}$$

where $R^{IV}$ is selected from phenyl, alkylphenyl, alkyne, or alkyl radicals having the formula $(CH_2-CH_2)_n$ where n is 1, 2 or 3; where R'' and R''' are selected from hydrogens, $(R-O-O-)$, alkyl, cycloalkyl, aralkyl, or aryl hydrocarbon radicals, when $R^{IV}$ is a phenyl group, or either R'' or R''' hydrocarbon radicals are radicals selected from phenyl, aryl or alkyls larger than $C_7H_{15}$ when $R^{IV}$ is the $(CH_2-CH_2)_n$ radical,
      b. about 10 to about 55 weight percent of a hydrocarbon solvent having a kauri-butanol number from about 10 to about 60 when the organic peroxide has R, R', R'', R''', and $R^{IV}$ radicals having aliphatic radicals or a minor amount of aromaticity, or having a kauri butanol number of about 40 to about 100 when the R, R', R'', R''' and $R^{IV}$ have a substantial amount of aromaticity;

c. about 1 to about 15 weight percent of one or more emulsifiers selected from
  (i) one or more polyalkylene glycol ethers, or
  (ii) one or more alkylaryl polyether alcohols, or
  (iii) one or more polyoxypropylene-polyoxyethylene condensates, or
  (iv) one or more phenoxypolyethoxyethanols or in any mixture thereof giving an HLB for the one or more emulsifiers in the range of about 9 to about 20, and d. at least about 20 weight percent of water; and (2) about 0.5 to about 10 weight percent of a coupling agent; and (3) about 70 to about 99 weight percent water.

16. A sizing composition of claim 15 having 0.001 to 1 weight percent of a lubricant.

17. A sizing composition of claim 15 wherein the coupling agent is vinyl tris(betamethoxyethoxy)silane.

18. A sizing composition of claim 16 wherein the lubricant is a cationic, acid solubilized fatty acid amide.

19. A sizing composition of claim 16 having 0.5 to about 12 weight percent of a film-former.

20. A sizing composition of claim 19 wherein the film-former is a vinyl acetate copolymer.

21. Glass fibers having the aqueous sizing composition of claim 15.

22. Glass fibers having the aqueous sizing composition of claim 16.

23. Glass fibers having the aqueous sizing composition of claim 19.

24. Aqueous sizing composition of claim 15 wherein the peroxide to solvent ratio is at least 1/0.4.

25. Aqueous sizing composition of claim 15 wherein three emulsifiers are present in equal amounts.

* * * * *